United States Patent
Laws

(10) Patent No.: US 7,154,502 B2
(45) Date of Patent: Dec. 26, 2006

(54) 3D GRAPHICS WITH OPTIONAL MEMORY WRITE BEFORE TEXTURING

(75) Inventor: Philip R. Laws, Staines (GB)

(73) Assignee: 3D Labs, Inc. Ltd., Hamilton (BM)

( * ) Notice: Subject to any disclaimer, the term of this patent is extended or adjusted under 35 U.S.C. 154(b) by 257 days.

(21) Appl. No.: 10/393,514

(22) Filed: Mar. 19, 2003

(65) Prior Publication Data

US 2004/0012599 A1   Jan. 22, 2004

Related U.S. Application Data

(60) Provisional application No. 60/366,127, filed on Mar. 19, 2002.

(51) Int. Cl.
| G06T 1/20 | (2006.01) |
| G06T 15/40 | (2006.01) |
| G06F 13/14 | (2006.01) |

(52) U.S. Cl. ............ 345/506; 345/422; 345/519
(58) Field of Classification Search .......... 345/506, 345/519, 502, 542, 422, 501, 541, 530, 421, 345/419, 418
See application file for complete search history.

(56) References Cited

U.S. PATENT DOCUMENTS

| 5,768,445 A * | 6/1998 | Troeller et al. ............ 382/305 |
| 6,025,853 A * | 2/2000 | Baldwin ..................... 345/506 |
| 6,259,461 B1 * | 7/2001 | Brown ........................ 345/556 |
| 6,268,875 B1 * | 7/2001 | Duluk et al. ............... 345/506 |
| 6,295,068 B1 * | 9/2001 | Peddada et al. ........... 345/419 |
| 6,344,852 B1 | 2/2002 | Zhu |
| 6,476,807 B1 * | 11/2002 | Duluk et al. ............... 345/506 |
| 6,697,063 B1 * | 2/2004 | Zhu ........................... 345/421 |
| 2002/0027553 A1 * | 3/2002 | Lindholm et al. .......... 345/426 |
| 2003/0076320 A1 * | 4/2003 | Collodi ...................... 345/426 |

OTHER PUBLICATIONS

P. Panda, N. Dutt, A. Nicolau, "Exploiting Off-Chip Memory Access Modes in High-Level Synthesis," Proceedings of the 1997 IEEE/ACM International Conference on Computer-aided Design, pp. 333-340, Nov. 1997.*
J. Tyson, "How Virtual Memory Works," http://computer.howstuffworks.com/virtual-memory.htm/printable.*
J. Tyson, "How Virtual Memory Works," http://computer.howstuffworks.com/virtual-memory.htm/printable.*

* cited by examiner

Primary Examiner—Ulka Chauhan
Assistant Examiner—Joni Hsu
(74) Attorney, Agent, or Firm—Groover & Holmes

(57) ABSTRACT

A 3D graphics architecture in which interfaces to memory are combined with pipeline processing. The rendering units are not all connected in a straight-through pipeline relationship: instead the rendering pipeline is "broken," so that the stream of fragments (e.g. triangles) being processed is parked in memory. This turns out to be surprisingly efficient as a way to separate rendering processes where the workload balance is different. Preferably a first write to memory is performed after transformation and lighting calculations and before double-pass Z-buffering, and a second write to memory is performed before texturing. If Z-buffering or texturing is not being used for a particular rendering task, one or both of the memory interfaces can be switched off for that task. This economizes on memory bandwidth while retaining full flexibility.

5 Claims, 7 Drawing Sheets

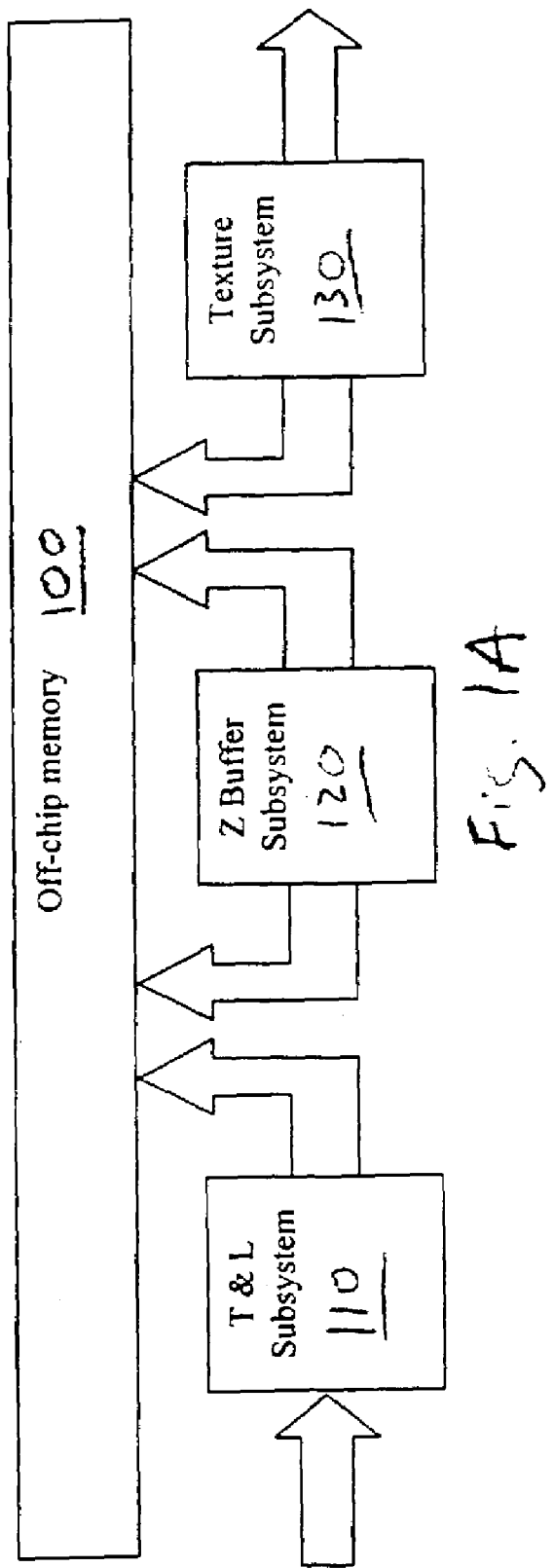

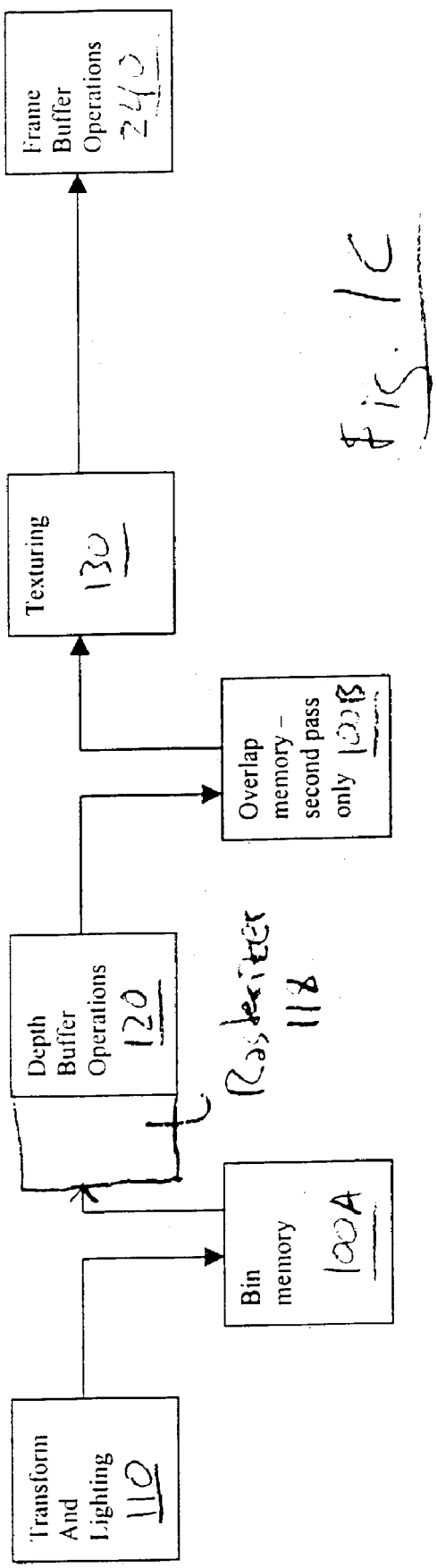

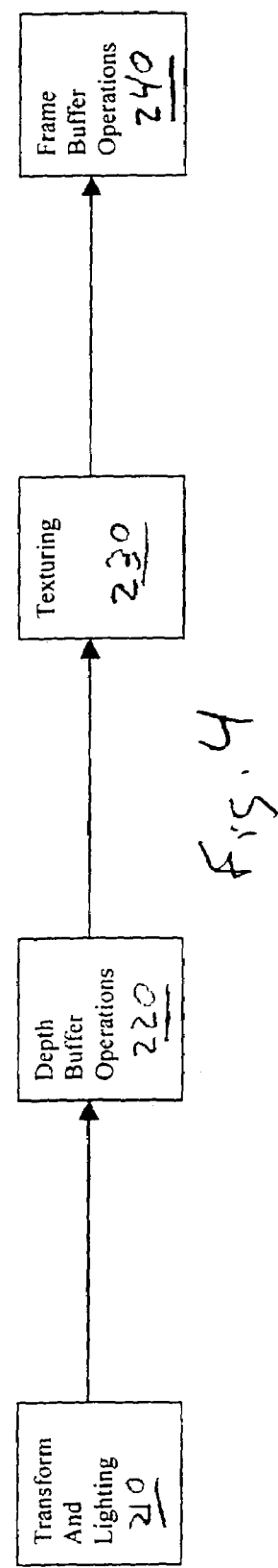

3D GRAPHICS WITH OPTIONAL MEMORY WRITE BEFORE TEXTURING

CROSS-REFERENCE TO OTHER APPLICATION

This application claims priority from U.S. provisional application 60/366,127, filed Mar. 19, 2002, which is hereby incorporated by reference.

BACKGROUND AND SUMMARY OF THE INVENTION

The present invention relates to 3D graphics, and particularly to data flow through rendering processors.

Background: 3D Computer Graphics

One of the driving features in the performance of most single-user computers is computer graphics. This is particularly important in computer games and workstations, but is generally very important across the personal computer market.

For some years the most critical area of graphics development has been in three-dimensional ("3D") graphics. The peculiar demands of 3D graphics are driven by the need to present a realistic view, on a computer monitor, of a three-dimensional scene. The pattern written onto the two-dimensional screen must therefore be derived from the three-dimensional geometries in such a way that the user can easily "see" the three-dimensional scene (as if the screen were merely a window into a real three-dimensional scene). This requires extensive computation to obtain the correct image for display, taking account of surface textures, lighting, shadowing, and other characteristics.

The starting point (for the aspects of computer graphics considered in the present application) is a three-dimensional scene, with specified viewpoint and lighting (etc.). The elements of a 3D scene are normally defined by sets of polygons (typically triangles), each having attributes such as color, reflectivity, and spatial location. (For example, a walking human, at a given instant, might be translated into a few hundred triangles which map out the surface of the human's body.) Textures are "applied" onto the polygons, to provide detail in the scene. (For example, a flat carpeted floor will look far more realistic if a simple repeating texture pattern is applied onto it.) Designers use specialized modelling software tools, such as 3D Studio, to build textured polygonal models.

The 3D graphics pipeline consists of two major stages, or subsystems, referred to as geometry and rendering. The geometry stage is responsible for managing all polygon activities and for converting three-dimensional spatial data into a two-dimensional representation of the viewed scene, with properly-transformed polygons. The polygons in the three-dimensional scene, with their applied textures, must then be transformed to obtain their correct appearance from the viewpoint of the moment; this transformation requires calculation of lighting (and apparent brightness), foreshortening, obstruction, etc.

However, even after these transformations and extensive calculations have been done, there is still a large amount of data manipulation to be done: the correct values for EACH PIXEL of the transformed polygons must be derived from the two-dimensional representation. (This requires not only interpolation of pixel values within a polygon, but also correct application of properly oriented texture maps.) The rendering stage is responsible for these activities: it "renders" the two-dimensional data from the geometry stage to produce correct values for all pixels of each frame of the image sequence.

The most challenging 3D graphics applications are dynamic rather than static. In addition to changing objects in the scene, many applications also seek to convey an illusion of movement by changing the scene in response to the user's input. The technical term for changing the database of geometry that defines objects in a scene is transformation. The operations involve moving an object in the X, Y, or Z direction, rotating it in relation to the viewer (camera), or scaling it to change the size. (The "X" coordinate can represent, for example, left-right position; "Y" the location in the top-to-bottom axis; and "Z" the position along the axis from "in front" to behind.)

Whenever a change in the orientation or position of the camera is desired, every object in a scene must be recalculated relative to the new view. As can be imagined, a fast-paced game needing to maintain a high frame rate will require many calculations and many memory accesses.

FIG. 2 shows a high-level overview of the processes performed in the overall 3D graphics pipeline. However, this is a very general overview, which ignores the crucial issues of what hardware performs which operations.

Texturing

There are different ways to add complexity to a 3D scene. Creating more and more detailed models, consisting of a greater number of polygons, is one way to add visual interest to a scene. However, adding polygons necessitates paying the price of having to manipulate more geometry. 3D systems have what is known as a "polygon budget," an approximate number of polygons that can be manipulated without unacceptable performance degradation. In general, fewer polygons yield higher frame rates.

The visual appeal of computer graphics rendering is greatly enhanced by the use of "textures." A texture is a two-dimensional image which is mapped into the data to be rendered. Textures provide a very efficient way to generate the level of minor surface detail which makes synthetic images realistic, without requiring transfer of immense amounts of data. Texture patterns provide realistic detail at the sub-polygon level, so the higher-level tasks of polygon-processing are not overloaded. See Foley et al., Computer Graphics: Principles and Practice (2. ed. 1990, corr. 1995), especially at pages 741–744; Paul S. Heckbert, "Fundamentals of Texture Mapping and Image Warping," Thesis submitted to Dept. of EE and Computer Science, University of California, Berkeley, Jun. 17, 1994; Heckbert, "Survey of Computer Graphics," IEEE Computer Graphics, November 1986, pp. 56; all of which are hereby incorporated by reference. Game programmers have also found that texture mapping is generally an efficient way to achieve very dynamic images without requiring a hugely increased memory bandwidth for data handling.

A typical graphics system reads data from a texture map, processes it, and writes color data to display memory. The processing may include mipmap filtering which requires access to several maps. The texture map need not be limited to colors, but can hold other information that can be applied to a surface to affect its appearance; this could include height perturbation to give the effect of roughness. The individual elements of a texture map are called "texels."

Background: Pipelined and Message-Passing Architectures

A series of patents from 3Dlabs have disclosed a 3D graphics architecture in which pipelined rendering is implemented by a message-passing architecture. Examples of various embodiments, and of ancillary features, include U.S. Pat. Nos. 5,701,444, 5,727,192, 5,742,796, 5,764,228, 5,764,243, 5,774,133, 5,777,629, 5,798,770, 5,805,868, 5,815,166, 5,835,096, 6,025,853, 6,111,584, 6,285,373, 6,348,919, and 6,377,266, all of which are hereby incorporated by reference.

FIG. 4 shows how rendering-related messages flow in a pure-pipeline message-passing architecture. In this figure, messages flow down the pipeline from left to right. Any bottlenecks anywhere in the pipeline will soon stall the entire pipeline.

In this example, a transform/lighting stage 210 generates data for fragment vertices, which is then rasterized (by a stage not shown) and Z-buffered (by depth buffer operation stage 220). The resulting per-pixel data is then passed to texturing stage 230, which performs remaining per-pixel tasks. The completed set of pixel data (for each frame) is then handled by frame buffer operations stage 240, which passes the frame buffer data along to LUTDAC or other outputs.

Background: Workload Balancing

During the process of drawing an image in 3D graphics, at various points in the frame, different sections of the system have different workloads. In a typical application, a background is normally drawn first, using fairly large polygons. This will therefore have quite a small workload for the transformation and lighting (T&L) part of the system, but a high workload for the rasterization, Z-buffering and texturing parts of the system. After the background has been drawn, the foreground components generally have much larger polygon counts, and much smaller projected areas per triangle. This therefore places a heavier workload on the T&L part, and eases the workload on the Z-buffering and texturing parts. These also may obscure large amounts of the background, however as this has already been rasterized and textured, this makes this initial work wasted effort.

It is desirable that all parts of the system should be kept busy at all times, in order to achieve maximum performance, and to make the most cost-effective system.

The standard solution to such a problem is to include fifos in the design, to smooth out bubbles in the processing, by allowing the T&L subsystem to run some number of fragments ahead of the rasterization and texturing subsystems. This however is only a short-term solution, as only a small number of fragments can be buffered up in such a design before the physical size of the fifo becomes a limiting factor.

3D Graphics with Optional Memory Write Before Texturing

The present application describes a 3D graphics architecture in which interfaces to memory are combined with pipeline processing. The rendering units are not all connected in a straight-through pipeline relationship: instead the rendering pipeline is "broken," so that the stream of fragments (e.g. triangles) being processed is parked in memory.

This turns out to be surprisingly efficient as a way to separate rendering processes where the workload balance is different. The Z-buffering operations are less computationally intensive than the texturing operations. It is preferable to include the first memory interface before Z-buffering, and the second one after Z-buffering. In one notable class of embodiments, a first write to memory is performed after transformation and lighting calculations and before rasterization and Z-buffering, and a second write to memory is performed before texturing.

Since stippling is required for accurate Z-buffering (so that the depth buffer doesn't contain pixels which should have been stippled out), so stippling too is preferably performed before the second memory access.

These interfaces to memory operate quite differently from the limited FIFO memory which is typically included in the hardware structure of any pipeline architecture. The memory interfaces which separate different groups of rendering processes are accesses to "open" memory, i.e. to main memory or to virtual memory. Space for these writes is typically provided by external memory devices, which are capacious and cheap. While there will inevitably be some size limit in any memory access, preferably these memory accesses are given enough memory allocation that their capacity is usually irrelevant to any one frame's rendering workload. (For example, in 2002-era PC architectures, several megabytes of storage may be assigned to each memory interface in the pipeline, so that sufficient fragments may be stored to keep each section of the pipeline busy.)

In a further teaching, a two-pass Z-buffering operation is performed before texturing: the first pass obtains the correct values for the maximum depth visible at each pixel, and the second path discards fragments which are invisible at each pixel of the final scene. This saves on processing, since the texturing operation processes only fragment's pixels which have passed the second pass of the Z-buffering operation.

Note that the use of two-pass Z-buffering is particularly efficient, but it is difficult to obtain the full efficiency of two-pass operation in a straight-through pipelined architecture. The use of memory writes according to the present application facilitates this, and thus facilitates reducing the number of texturing operations to a bare minimum.

The use of additional off-chip memory accesses may seem paradoxical, since it slows down the minimum time to complete processing of a single pass through the pipeline. However, the surprising teaching of the present application is that these additional memory accesses can actually provide a net increase in average throughput. That is, performing two operations per pixel at the Z-buffering stage provides a net reduction in total burden.

In a further class of embodiments, at least one of the memory interfaces is made optional. If two-pass Z-buffering or texturing is not being used for a particular rendering task, one or both of the memory interfaces can be switched off for that task. This economizes on memory bandwidth for such tasks, while retaining full flexibility for optimization in general.

Preferably the first memory access writes fragment data, not full pixel data. That is, data would be given for the three vertices of a triangle (locations, colors, etc.), but the values for the interior pixels would not yet be specified. Thus this interface consumes a relatively low memory bandwidth.

Preferably the rasterization operation, which translates perfragment data into fragment's-pixel data, is performed after the first memory interface. This permits the Z-buffering to be calculated correctly on a per-pixel basis. Since the two-step Z-buffering operation will filter out many fragment's-pixels, shading and most further operations are preferably deferred until after the second memory interface.

These various embodiments are particularly advantageous in balancing workload between two-pass Z-buffering and the texturing and related processes. Since the texturing operations are much more computationally burdensome, there is NO cost to performing the second pass Z-buffer test before the memory interface.

BRIEF DESCRIPTION OF THE INVENTION

The disclosed inventions will be described with reference to the accompanying drawings, which show important sample embodiments of the invention and which are incorporated in the specification hereof by reference, wherein:

FIG. 1A is an overview of the flow of rendering tasks through three major stages of the transformation and rendering processes.

FIG. 1C shows a more detailed view of a preferred embodiment, in which bin memory is used to buffer fragment data between Transform/lighting stage and Z-buffer stage, and overlap memory is used to hold pixel data from the second pass of Z-buffering.

FIG. 4 shows how rendering-related messages flow in a pure-pipeline message-passing architecture.

DETAILED DESCRIPTION OF THE PREFERRED EMBODIMENTS

The numerous innovative teachings of the present application will be described with particular reference to the presently preferred embodiment (by way of example, and not of limitation).

As discussed above, a pure-pipeline architecture will be limited by the throughput of its slowest link.

The solution adopted here is to add a memory interface to the pipeline, and to store the primitive stream in external memory devices, as these are both large in terms of the amount of storage offered and cheap. Using such a system, several megabytes of storage may be assigned to each memory interface in the pipeline, so that sufficient primitives may be stored to keep each section of the pipeline busy.

Of the three operations described above, T&L, Z buffering and texturing, Z buffering is by far the simplest.

By using the scheme above to store primitive stream in off-chip memory, it is possible to process each primitive twice, by reading through the primitive stream twice. On the first pass, only the local buffer is updated, and only for those primitives which do not have any form of transparency. On the second pass, the Z test for opaque pixels is changed to equality, such that only those pixels that are visible in the final scene are textured. Additionally any transparent pixels that will be overdrawn later by opaque pixels will fail the Z test, and as such not be textured. This has the effect of deferring the texturing until after the Z buffering has been completed.

FIG. 1A is an overview of the flow of rendering tasks through three major stages of the transformation and rendering processes. A stream of fragments, generated e.g. by a CPU running game software, is provided as input to the transformation/lighting subsystem 110.

Non-Deferred Rendering

Figure 1B:
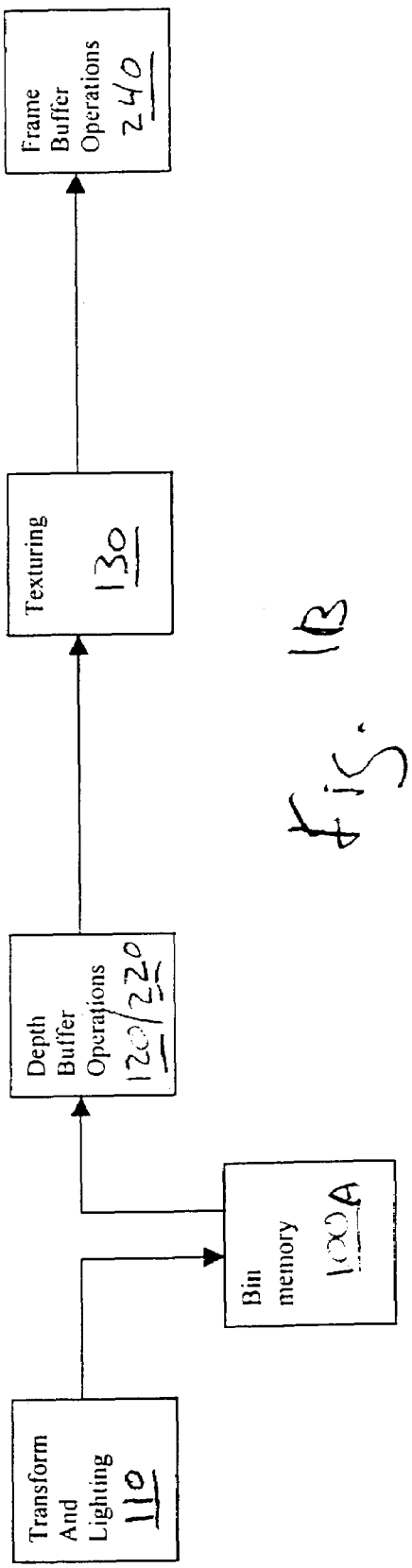
FIG. 1B is an overview of a first sample embodiment, in which memory is used to buffer fragment data between the trans-form/lighting stage and the Z-buffer stage.

FIG. 1B is an overview of a first sample embodiment, in which bin memory 100A is used to buffer fragment data between transform/lighting stage 110 and Z-buffer stage 120 or 220.

If deferred texturing is not being used, the input vertices are processed by the transform/lighting stage 110, and the resulting messages are saved into memory after the transformation and lighting. (These messages specify vertices of fragments, but note that this is different from the pixel data which will appear after rasterizing.) The data thus saved into memory will later be read out for rasterizing, depth buffer, texture (130) and frame buffer (240) processing.

This allows the transformation and lighting processing for the next frame to continue while the depth buffer, texture and frame buffer processing is being done for the current frame.

Deferred Rendering

FIG. 1C shows a more detailed view of a preferred embodiment, in which bin memory 100A is used to buffer fragment data between Transform/lighting stage 110 and Z-buffer stage 120 or 220, and overlap memory 100B is used to hold pixel data from the second pass of Z-buffering performed by stage 120.

Messages are saved into memory after the transformation and lighting: "bin memory" space 100A is used to hold this fragment data. (For example, the locations and colors of the three vertices of a triangle would be stored, along with other data relating to the triangle.) The fragment data are preferably replayed twice, to enable two-pass Z-buffering. (Rasterizer 118 generates pixel identifications for the frame pixels affected by each fragment.) The pixel data from the first pass of Z-buffering is discarded, and serves merely to place the correct depth values into the depth buffer. (The depth buffer is implemented by a local buffer.) The second pass of the Z-buffering operation produces a reduced set of pixel data, since some pixels can be discarded as occluded. The reduced pixel data is saved into memory after depth buffer processing, in overlap memory space 100B. The Texturing stage 130 fetches this pixel data in turn, and further texture (130) and frame buffer processing (240) are then performed conventionally.

This allows the transformation and lighting processing for the next frame to continue while the depth buffer, texture and frame buffer processing is being done for the current frame. It also allows the first pass of the next frame to be processed while the texture and frame buffer processing is being done for the current frame.

If the image is not Z buffered, or not textured, then the second memory interface may be switched off, to conserve memory bandwidth.

Thus there are two stages of memory buffering in this embodiment: if deferred texturing is being used, the input vertices are processed by the T&L subsystem, and the results output to memory. These are read back in at some later point, and the Z buffer processing done. The outputs are discarded. The T&L results are then re-read, and the Z buffer processing done again, such that this time only pixels visible in the final scene pass the Z test, and the results are written out to memory. At some later time these are read in and processed by the texture subsystem. The asynchronicity permitted by two stages of memory buffering means that multiprocessing can be introduced after either or both of these memory accesses, although multiprocessing of the texturing operations is more likely to be advantageous.

If the image is not Z buffered, or not textured, then the 2-pass deferred texturing scheme will not be used.

System Integration Alternatives

The disclosed inventions can be embodied in a variety of system implementations:

The most preferred embodiment is to combine the transform/lighting stage 110, the rasterizer 118 and Z-buffering stage 120, and the texturing (etc.) stage 130 on a single chip. This embodiment is illustrated in the following system diagrams, but it is important to recognize that there are alternatives.

One important alternative is implement the transform/lighting stage 110 in a dedicated "geometry engine" chip, and the Z-buffering stage 120 (with rasterizer 118) and the texturing stage 130 on a single graphics accelerator chip.

Another important alternative is perform the functions of the transform/lighting stage 110 in a host CPU, so the dedicated graphics hardware takes over only from the point where fragment data is fetched from "bin memory" space 100A.

Another important alternative is to use multiple parallelled hardware units to perform the functions of the texturing stage 130. The write to "overlap memory" space 100B provides a very convenient data transfer point which can be used to implement multitasking in texturing operations if desired.

Sample Computer System Embodiment

Figure 1D:
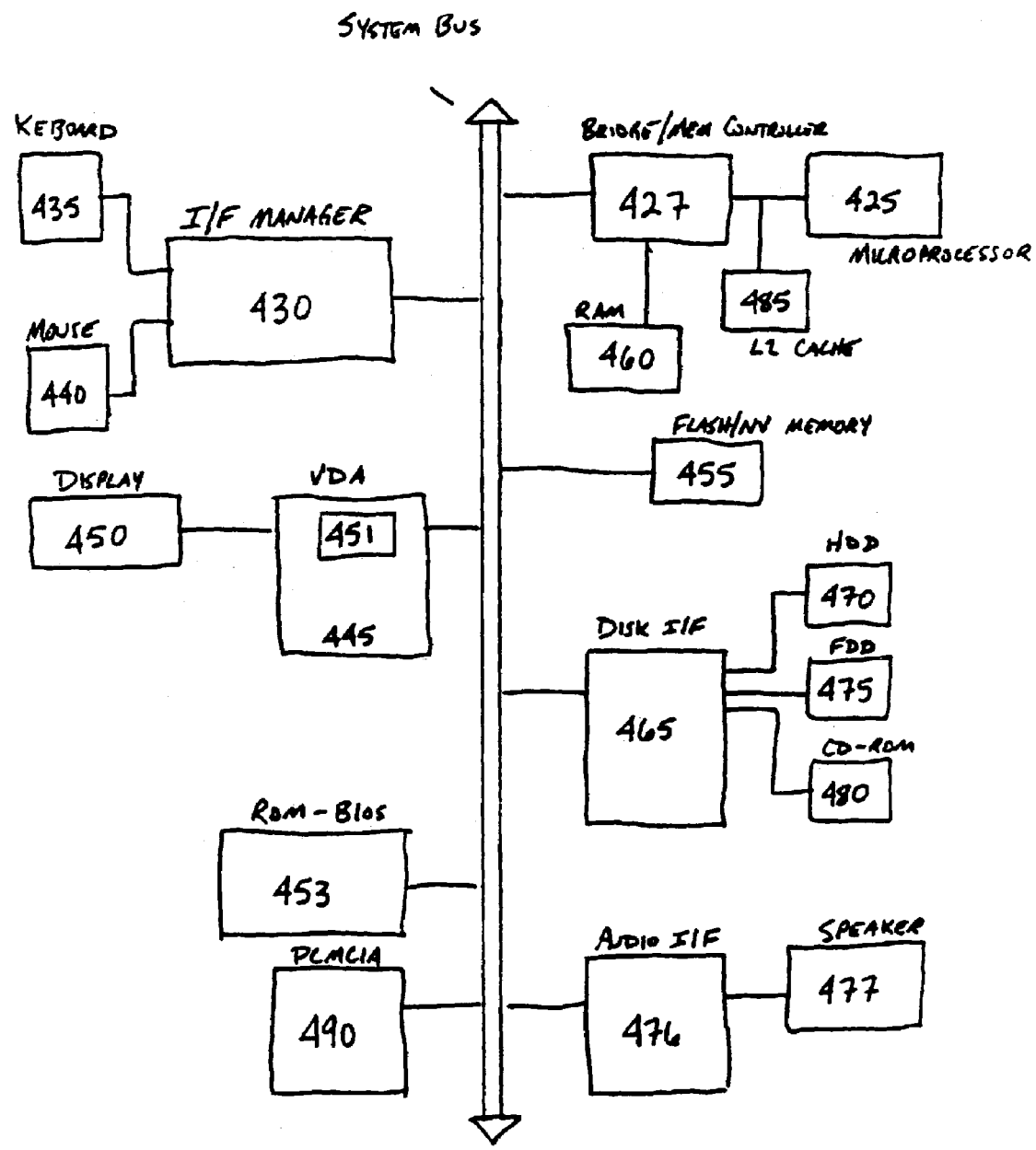
FIG. 1D is an overview of a computer system, with a rendering subsystem, which advantageously incorporates the disclosed graphics architecture.
Figure 2:
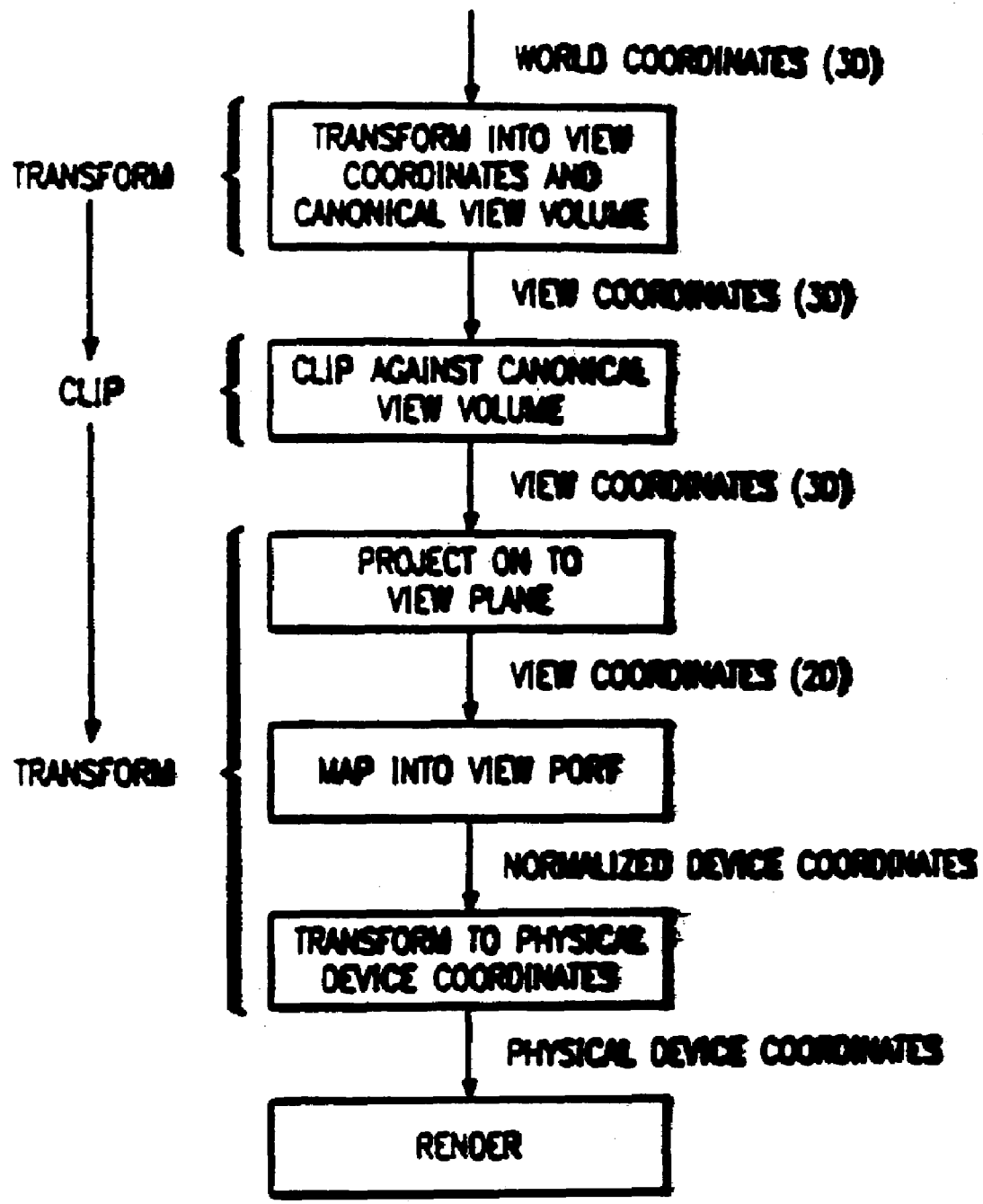
FIG. 2 is a very high-level view of processes performed in a 3D graphics computer system.

FIG. 1D is an overview of a computer system, with a video display adapter 445 in which the embodiments of FIG. 1C or 1B can advantageously be implemented. The complete computer system includes in this example: user input devices (e.g. keyboard 435 and mouse 440); at least one microprocessor 425 which is operatively connected to receive inputs from the input devices, across e.g. a system bus 431, through an interface manager chip 430 which provides an interface to the various ports and registers; the microprocessor interfaces to the system bus through perhaps a bridge controller 427; a memory (e.g. flash or non-volatile memory 455, RAM 460, and BIOS 453), which is accessible by the microprocessor; a data output device (e.g. display 450 and video display adapter card 445) which is connected to output data generated by the microprocessor 425; and a mass storage disk drive 470 which is read-write accessible, through an interface unit 465, by the microprocessor 425.

Optionally, of course, many other components can be included, and this configuration is not definitive by any means. For example, the computer may also include a CD-ROM drive 480 and floppy disk drive ("FDD") 475 which may interface to the disk interface controller 465. Additionally, L2 cache 485 may be added to speed data access from the disk drives to the microprocessor 425, and a PCMCIA 490 slot accommodates peripheral enhancements. The computer may also accommodate an audio system for multimedia capability comprising a sound card 476 and a speaker(s) 477.

Figure 3:
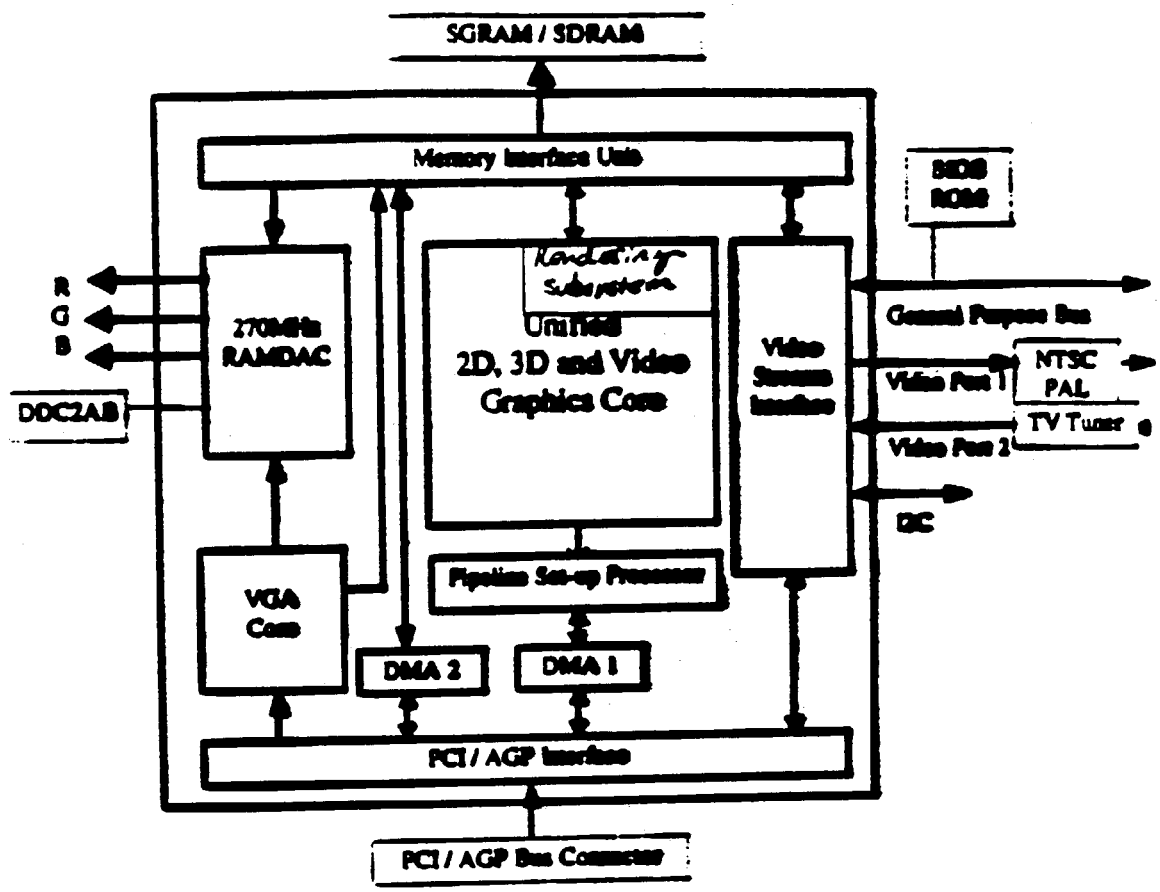
FIG. 3 shows a block diagram of a 3D graphics accelerator subsystem.

FIG. 3 shows a block diagram of a graphics processor which can incorporate the disclosed innovations in its rendering subsystem. A sample board incorporating the P3™ graphics processor may include these elements:

- the P3™ graphics core itself;
- a PCI/AGP interface;
- DMA controllers for PCI/AGP interface to the graphics core and memory;
- SGRAM/SDRAM, to which the chip has read-write access through its frame buffer (FB) and local buffer (LB) ports;
- a RAMDAC, which provides analog color values in accordance with the color values read out from the SGRAM/SDRAM; and
- a video stream interface for output and display connectivity.

According to a disclosed class of innovative embodiments, there is provided: A 3D graphics processing architecture, comprising: a rasterization stage which, when active, generates outputs for multiple respective pixels of multiple fragments; a Z-buffering stage which, when active, performs Z-buffering processes for ones of said pixels to obtain a set of comparison values in a Z-buffer, and then tests said pixels of said fragments against said Z-buffer comparison values to determine which pixels are occluded, and then writes corresponding pixel data, for at least some said fragments, to memory; and at least one further rendering stage which, when active, reads pixel data from said memory, and performs per-pixel rendering operations thereon.

According to another disclosed class of innovative embodiments, there is provided: A reconfigurable architecture for processing 3D graphics, comprising: a rasterization stage which, when active, generates outputs for multiple respective pixels of multiple fragments; and a Z-buffering stage which: in a first mode, performs single-pass Z-buffering for ones of said pixels, and transmits corresponding pixel data, for at least some said fragments, to at least one further rendering stage which performs per-pixel rendering; and in a second mode, performs multi-pass Z-buffering for ones of said pixels, and writes corresponding pixel data, for at least some said fragments, to memory.

According to another disclosed class of innovative embodiments, there is provided: An architecture for processing 3D graphics, comprising: a transform/lighting stage which programmably performs lighting calculations and geometric transforms on incoming data; a Z-buffering stage which performs Z-buffering calculations; and a texturing stage which performs at least some per-pixel rendering operations; wherein outputs of said transform/lighting stage are written to bulk memory which is not local to said transform/lighting stage nor to Z-buffering stage, and wherein said Z-buffering stage reads input data from said bulk memory; and wherein outputs of said Z-buffering stage are written to bulk memory which is not local to said Z-buffering stage, and wherein said texturing stage reads input data from said bulk memory.

According to another disclosed class of innovative embodiments, there is provided: An architecture for processing 3D graphics, comprising: a transform/lighting stage which programmably performs lighting calculations and geometric transforms on incoming data, and writes resulting fragment data to bulk memory which is not local to said transform/lighting stage; a Z-buffering stage, which performs multi-pass Z-buffering on pixel data corresponding to said fragment data, and writes resulting pixel data to bulk memory; and a texturing stage which reads said pixel data from said bulk memory, and performs at least some per-pixel rendering operations, to thereby generate image data outputs.

According to another disclosed class of innovative embodiments, there is provided: A reconfigurable architecture for processing 3D graphics, comprising: a transform/lighting stage which programmably performs lighting calculations and geometric transforms on incoming data, and which writes resulting fragment data, through a respective memory interface, to bulk memory which is not local to said transform/lighting stage; a rasterization stage which, when active, reads said resulting fragment data from said bulk memory, and generates pixel outputs for multiple respective pixels of said fragments; a Z-buffering stage which, when active, performs Z-buffering processes for ones of said pixels to obtain Z-buffer comparison values, and then tests each of said pixels against said Z-buffer comparison values to determine which fragment-pixels are occluded, and then writes corresponding pixel outputs, through a second respective memory interface, to bulk memory which is not local to said Z-buffering stage; and a texturing stage which, when active, reads said pixel data from said bulk memory, and performs at least some per-pixel rendering operations, to thereby generate image data outputs; wherein, when one of said Z-buffering and texturing stages are inactive, at least one of said memory interfaces is also made inactive.

According to another disclosed class of innovative embodiments, there is provided: A graphics processing method, comprising the steps of: performing Z-buffering on pixels of multiple fragments in a frame, selectably in either first or second modes, wherein in said first mode, said Z-buffering is performed as a multipass operation on each pixel, and resultant pixel data is written to a memory, and in said second mode, said Z-buffering is performed as a single-pass operation, and resultant pixel data is transferred to a further pixel-rendering stage without being first written to said memory.

According to another disclosed class of innovative embodiments, there is provided: A 3D graphics processing method, comprising the actions of: for each frame, performing a Z-buffering process to generate a final depth buffer which defines what fragments are visible, for each pixel of the frame; performing a second Z-buffering process using said final depth buffer to exclude fragments which are not visible; and texturing only those pixels of fragments which have passed said Z-buffering test.

According to another disclosed class of innovative embodiments, there is provided: A computer system, comprising: at least one central processing unit; at least one main memory which is read/write accessible by said central processing unit; and specialized graphics-processing logic, which performs rendering functions on graphics data generated by said central processing unit, and which includes at least a Z-buffering stage which, when active, performs Z-buffering processes for ones of said pixels to obtain a set of comparison values in a Z-buffer, and then tests said pixels of said fragments against said Z-buffer comparison values to determine which pixels are occluded, and then writes corresponding pixel data, for at least some said fragments, to said main memory; and at least one further rendering stage which, when active, reads pixel data from said memory, and performs per-pixel rendering operations thereon.

According to another disclosed class of innovative embodiments, there is provided: A computer system, comprising: at least one central processing unit; at least one main memory which is read/write accessible by said central processing unit; and specialized graphics-processing logic, which performs rendering functions on graphics data generated by said central processing unit, and which includes at least a Z-buffering stage which, in a first mode, performs single-pass Z-buffering for ones of said pixels, and transmits corresponding pixel data, for at least some said fragments, to at least one further rendering stage which performs per-pixel rendering; and in a second mode, performs multi-pass Z-buffering for ones of said pixels, and writes corresponding pixel data, for at least some said fragments, to memory.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Preferably most of the per-pixel computations are performed, with texturing, after the second memory access. However, optionally some of these may be performed before the second memory access, particularly if they result in reduction of the pixel processing workload for later stages. This can provide efficiencies if the limit on throughput is found to be the per-pixel processing after bottleneck.

Note that the disclosed inventions can be used with a variety of memory architectural choices. For example, a fast on-chip (or on-module) memory can be used as the target of the second access, particularly if it is big enough to hold a full frame's worth of pixels (including some multiplier, e.g. 2×, to allow for multiple fragments which may affect a single viewpoint pixel).

In other alternative embodiments the Z-buffering information can also be used in other ways. Normally Z-buffering looks for the nearest opaque object, to determine what (further out) objects are occluded; but alternatively the Z-buffering process can be used to select in the opposite direction, e.g. to accelerate the buffer clearing process by avoiding the need for a full buffer clear per frame.

In this sample embodiment, the output of the texturing stage goes directly to a frame buffer stage, which feeds a RAMDAC for display. However, it is alternatively possible to feed the frame buffer output to a file, or to a video compression module, or to one channel of a stereographic display.

The transformation and lighting calculations are the most easily separated from the per-pixel operations. For example, the transformation and lighting calculations can be done by a host computer, by a "geometry engine" (which is specialized for such calculations), by the same chip which handles the texturing jobs, or by another graphics chip.

In another class of embodiments, discrete multiprocessing elements can be combined on a single chip (or in a single multichip integrated module). In such embodiments the memory 100 can be a per-chip block of memory which is not "local" to any one of the multiprocessing elements, but is shared by all of them.

Additional general background, which helps to show variations and implementations, may be found in the following publications, all of which are hereby incorporated by reference: Advances in Computer Graphics (ed. Enderle 1990); Angel, Interactive Computer Graphics: A Top-Down Approach with OpenGL; Angel, High-Resolution Computer Graphics Using C (1990); the several books of "Jim Blinn's Corner" columns; Computer Graphics Hardware (ed. Reghbati and Lee 1988); Computer Graphics: Image Synthesis (ed. Joy et al.); Eberly, 3D Game Engine Design (2000); Ebert, Texturing and Modelling 2. ed. (1998); Foley et al., Fundamentals of Interactive Computer Graphics (2. ed. 1984); Foley, Computer Graphics Principles & Practice (2. ed. 1990); Foley, Introduction to Computer Graphics (1994); Glidden, Graphics Programming With Direct3D (1997); Hearn and Baker, Computer Graphics (2. ed. 1994); Hill, Computer Graphics Using OpenGL; Latham, Dictionary of Computer Graphics (1991); Tomas Moeller and Eric Haines, Real-Time Rendering (1999); Michael O'Rourke, Principles of Three-Dimensional Computer Animation; Prosise, How Computer Graphics Work (1994); Rimmer, Bit Mapped Graphics (2. ed. 1993); Rogers et al., Mathematical Elements for Computer Graphics (2. ed. 1990); Rogers, Procedural Elements For Computer Graphics (1997); Salmon, Computer Graphics Systems & Concepts (1987); Schachter, Computer Image Generation (1990); Watt, Three-Dimensional Computer Graphics (2. ed. 1994, 3. ed. 2000); Watt and Watt, Advanced Animation and Rendering Techniques:

Theory and Practice; Scott Whitman, Multiprocessor Methods For Computer Graphics Rendering; the SIGGRAPH Proceedings for the years 1980 to date; and the IEEE Computer Graphics and Applications magazine for the years 1990 to date. These publications (all of which are hereby incorporated by reference) also illustrate the knowledge of those skilled in the art regarding possible modifications and variations of the disclosed concepts and embodiments, and regarding the predictable results of such modifications.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A reconfigurable architecture for processing 3D graphics, comprising:
    a transform/lighting stage which programmably performs lighting calculations and geometric transforms on incoming data, and which writes resulting fragment data, through a respective memory interface, to bulk memory which is not local to said transform/lighting stage;
    a rasterization stage which, when active, reads said resulting fragment data from said bulk memory, and generates pixel outputs for multiple respective pixels of said fragments;
    a Z-buffering stage which, when active,
    performs Z-buffering processes for ones of said pixels to obtain Z-buffer comparison values,
    and then tests each of said pixels against said Z-buffer comparison values to determine which fragment-pixels are occluded,
    and then writes corresponding pixel outputs, through a second respective memory interface, to bulk memory which is not local to said Z-buffering stage; and
    a texturing stage which, when active, reads said pixel outputs from said bulk memory, and performs at least some per-pixel rendering operations, to thereby generate image data outputs;
    wherein, when one of said Z-buffering and texturing stages are inactive, at least one of said memory interfaces is also made inactive.

2. The architecture of claim 1, wherein said transform/lighting stage and said Z-buffering stage are integrated on a common chip, and said bulk memory is not on said chip.

3. The architecture of claim 1, wherein said Z-buffering and texturing stages each have a message-passing pipelined architecture.

4. The architecture of claim 1, wherein said bulk memory consists of main memory.

5. The architecture of claim 1, wherein said bulk memory is provided by virtual memory.

* * * * *